April 18, 1933. V. BENDIX ET AL 1,904,262

BRAKE

Filed Oct. 5, 1927

INVENTOR
VINCENT BENDIX
LUDGER E. LA BRIE
BY
M. W. McConkey
ATTORNEY

Patented Apr. 18, 1933

1,904,262

UNITED STATES PATENT OFFICE

VINCENT BENDIX, OF CHICAGO, ILLINOIS, AND LUDGER E. LA BRIE, OF SOUTH BEND, INDIANA; SAID BENDIX ASSIGNOR TO BENDIX BRAKE COMPANY, OF SOUTH BEND, INDIANA, A CORPORATION OF ILLINOIS

BRAKE

Application filed October 5, 1927. Serial No. 224,085.

This invention relates to brakes and is illustrated as embodied in an internal expanding brake for an automobile.

An important object of the invention is to arrange a brake of the type which shifts its anchorage in different directions with changes in the direction of rotation of the brake drum, in such a manner as to predetermine the direction of shifting so that the anchored part of the brake does not first leave its anchorage and then come back to it in such a manner as to cause a slight shock. That is, with the brake constructed according to our invention under any ordinary conditions the anchored part of the brake is selected in advance so that it never leaves its anchorage.

In one desirable arrangement the friction means of the brake includes an auxiliary or servo shoe which engages the brake drum prior to full engagement of the friction means with the drum, and which is arranged in such a manner as to be urged frictionally by the drum in a direction serving to hold the anchored part of the brake against its anchorage. In order to simplify the connections as much as possible, we prefer to connect the servo shoe to one of the ends of a shiftable friction device, for example by a pivot, and to apply the brakes by means such as a cam which acts on the servo shoe and on the end of the friction device opposite the end to which the shoe is pivoted. In the illustrated brake the shiftable friction device includes two connected shoes which may be formed at their ends for engagement with a pair of pins serving as anchorages against one or the other of which all of the torque of the brake is taken when the brake is applied.

In order to minimize the gaps between the shoes or their equivalents, we prefer to cause the servo shoe to overlap one or both the ends of the shiftable friction device, for example by making the servo shoe generally channel-shaped in cross-section and causing the ends of the friction device to extend into the opposite ends of the channel of the servo shoe.

The above and other objects and features of the invention, including various novel and desirable details of construction, will be apparent from the following description of the illustrative embodiment shown in the accompanying drawing, in which.

Figure 1:
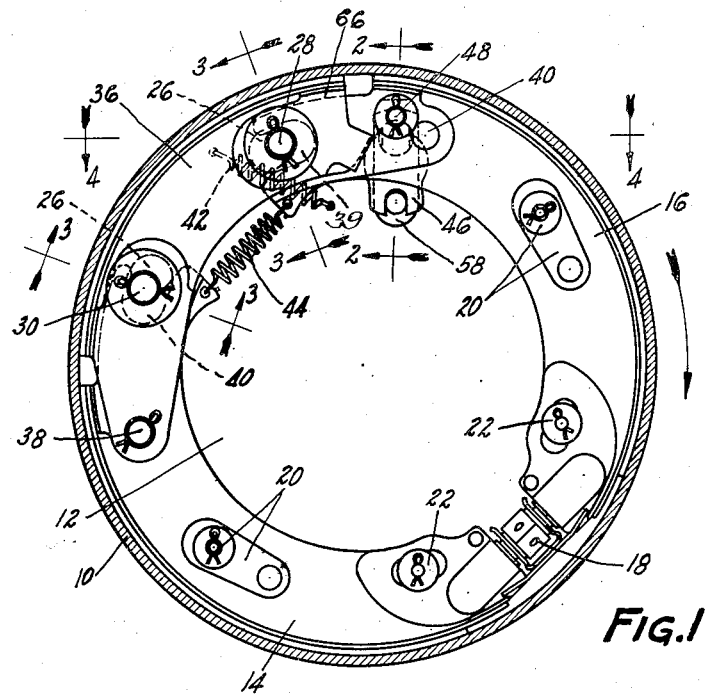
Figure 1 is a vertical section through the brake just inside the head of the brake drum, showing the brake shoes in side elevation.
Figure 2:
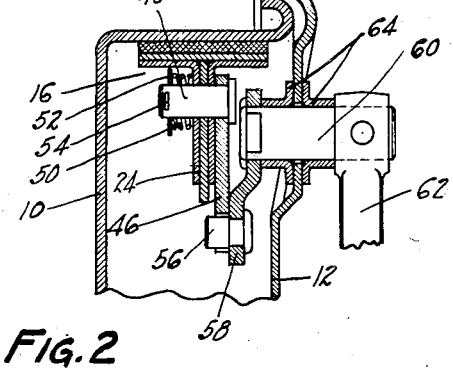
Figure 2 is a partial radial section on the line 2—2 of Figure 1, showing the applying means of the brake.

The particular brake selected for illustration includes a rotatable brake drum 10, at the open side of which is a backing plate or other support 12, and within which is arranged the friction means of the brake.

The particular friction means illustrated includes a shiftable friction device comprising a pair of substantially rigid brake shoes 14 and 16, which are preferably interchangeable with respect to each other, and which are adjustably connected by a suitable floating pivot 18. Suitable positioning devices 20 and 22, in the nature of "steady rests", may be provided for shoes 14 and 16.

Each of the shoes 14 and 16 is generally T-shaped in cross-section, and at the unpivoted ends of the shoes the central stiffening web is extended a substantial distance beyond the brake lining and is reinforced by separate plates 24 welded or otherwise secured to its opposite sides. The triple thickness web thus formed is notched out or otherwise formed at 26 at its end for engagement with one or the other of two fixed anchors 28 and 30, which are substantially alike in construction and arrangement and one of which is shown in detail in Figure 3. Each anchor may have a collar 31 engaging a reinforcing and spacing member 32 and clamping it against the backing plate 12 through the medium of a locknut 34.

Figure 3:
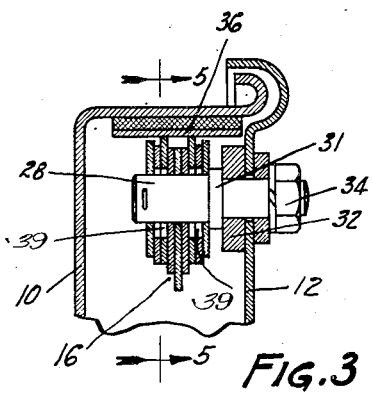
Figure 3 is a section through one or the other of the anchors substantially on one of the lines 3—3 of Figure 1.
Figure 5:
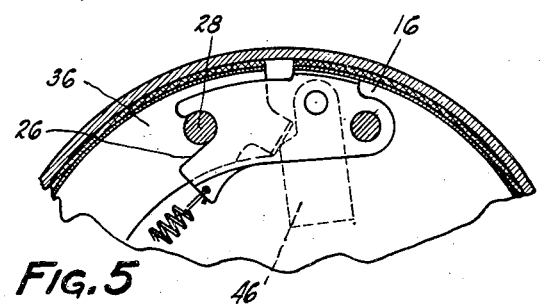
Figure 5 is a partial section on the line 5—5 of Figure 3 showing the arrangement of one of the anchors with respect to one end of the friction device.
Figure 4:
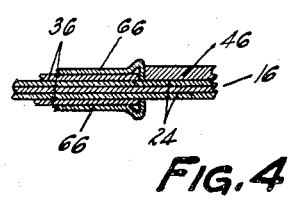
Figure 4 is a partial section on the line 4—4 of Figure 1, and showing the engagement of the applying cam with one end of the servo shoe.

Between the ends of the shiftable friction device comprising the shoes 14 and 16 there is arranged a servo shoe 36 preferably channel-shaped in section as shown in Figure 3, so that the ends of the webs of the shoes 14 and 16 extend into opposite ends of the channel of the shoe 36. The servo shoe 36 is preferably connected to the shoe 14 by a floating pivot 38, an opening 40 being provided in shoe 16 at the same point as the opening in shoe 14 for the pivot 38, so that the two shoes may be entirely interchangeable. The two webs of the shoe 36 are formed with relatively large openings 39 for the two anchors 28 and 30, so that there is no interference with the shoe by the anchors.

The shoe 36 is urged inwardly away from the brake drum by a suitable return spring 42 connected at one end to the shoe and at the other end to the backing plate 12. There is also a main return spring 44 connected between the ends of the two shoes 14 and 16 and urging them away from the drum. By virtue of the above-described arrangement it will be seen that the servo shoe 36 overlaps the ends of the shoes 14 and 16 in the sense that it extends into the sectors of the drum occupied by the ends of the illustrated shoes. This permits the lining of the shoe 36 to be brought very close to the ends of the lining on the shoes 14 and 16, thus minimizing the effective length of the gap between the shoes.

The applying means of the brake is illustrated as including a floating cam member 46 mounted on the shoe 16 by a pivot 48 passing through the cam and through the web of the shoe, and provided with an anti-spring 50 confined between the web of the shoe and a washer 52 held on the end of the pivot by a cotter pin 54. The lower end of this cam member 46 is notched out to receive a thrust pin 56 in the end of a lever 58 mounted on an operating shaft 60 having an operating arm 62 at its end on the opposite side of the backing plate 12. The shaft 60 is shown journalled in a pair of tubularly drawn steel stampings 64 spot-welded or otherwise secured to the backing plate 12. The cam 46 thrusts against a stamping 66 welded or otherwise secured to the side of one or the other of the webs of the shoes 36 and which has a portion extending across the end of the web to receive the thrust of the cam. We prefer to provide both of the webs of the shoe 36 with stampings 66 so that the shoe may be used interchangeably either on a right or a left brake.

In operation the rocking of the shaft 60 to apply the brake causes the cam 46 to exert a spreading action between the shoe 36 and the shoe 16. It will be observed in Figure 1 that the thrust surface on the stamping 66 on the shoe 36 is so inclined that the spreading action of the cam first swings the shoe 36 against the drum before there is any substantial separation of the shoes 36 and 16, and therefore the spring 44 holds the two shoes 14 and 16 away from the drum until after the engagement with the drum of the shoe 36. This action is facilitated by making spring 42 lighter than spring 44. If the drum is turning clockwise the shoe 36 will be urged clockwise by the drum and will hold the shoe 14 against the anchor 30 during the remainder of the applying action caused by the further rocking of the cam 46. If, on the contrary, the drum is turning counterclockwise, the shoe 36 is urged by the drum in a direction to force the shoe 16 against the anchor 28 prior to the completion of the applying movement of the cam 46. As the shoes 14 and 16 are both still in engagement with the anchors 28 and 30 at the time the shoe 36 first engages the drum, it will be seen that ordinarily the shoe which is to remain anchored never leaves its anchorage at all and that there is therefore no shock due to the shifting of the anchors.

While one illustrative embodiment of the invention has been described in detail, it is not my intention to limit its scope to that particular embodiment or otherwise than by the terms of the appended claims.

We claim:

1. A brake comprising, in combination, a drum, friction means including at least three shoes engageable with the drum and shiftable to anchor at one end when the drum is turning in one direction and at a point intermediately arranged between its ends when the drum is turning in the other direction, and applying means engaging said ends.

2. A brake comprising, in combination, a plurality of shoes shiftable to anchor on different shoes, and an additional shoe pivoted to one of said shoes and arranged between the ends of said shoes.

3. A brake comprising, in combination, a friction device shiftable to anchor at either end, a shoe pivoted to one end of said device and arranged between the ends of said device, and applying means directly engaging said shoe and the end of said device to which the shoe is not pivoted.

4. A brake comprising, in combination, a drum, a pair of connected shoes engageable with the drum and arranged to anchor on one shoe when the drum is turning in one direction and on the other shoe when the drum is turning in the other direction, and a third shoe connected to one of said pair of shoes and arranged between the pair of shoes.

5. A brake comprising, in combination, a drum, a pair of connected shoes engageable with the drum and arranged to anchor on one shoe when the drum is turning in one direction and on the other shoe when the drum is turning in the other direction, a third shoe connected to one of said pair of shoes and arranged between the pair of shoes, and applying means acting on the third shoe and on the other of said pair of shoes.

6. A brake comprising, in combination, a friction device shiftable to anchor adjacent either end, and a servo shoe acting on and overlapping said ends and pivoted to one of said ends.

7. A brake comprising, in combination, a friction device shiftable to anchor adjacent either end, a servo shoe acting on at least one of said ends and overlapping at least one of said ends, and applying means directly engaging the servo shoe and the other of said ends.

8. A brake comprising, in combination, a friction device shiftable to anchor adjacent either end, and a channel-section servo shoe arranged with the ends of the friction device extending into opposite ends of its channel, together with applying means acting on the servo shoe and on one of said ends.

9. A brake comprising, in combination, a drum, a floating friction device engageable with the drum and having alternatively-anchoring parts, a servo shoe acting on the friction device adjacent one end, and an applying device engaging the servo shoe and the other end of the friction device and forcing them in opposite direction to apply the brake.

10. A brake comprising, in combination, a drum, a friction device within and engageable with the drum, and which has two different anchorage parts, one of which anchors when the drum is turning in one direction and the other of which anchors when the drum is turning in the other direction, and applying means arranged to force at least one end of the friction device against the drum and thereafter to cause expansion of the friction device, the engagement of said end serving to predetermine the anchorage.

11. A brake comprising, in combination, a drum, a friction device within and engageable with the drum and including a series of pivotally-connected shoes and which has two different anchorage parts, one of which anchors when the drum is turning in one direction and the other of which anchors when the drum is turning in the other direction, and applying means arranged to force at least one end of the friction device against the drum and thereafter to cause expansioin of the friction device, the engagement of said end serving to predetermine the anchorage.

12. A brake comprising, in combination, a drum, a friction device within and engageable with the drum and which has two different anchorage parts, one of which anchors when the drum is turning in one direction and the other of which anchors when the drum is turning in the other direction, and an applying device acting in two stages: (1) to force at least one end of the friction device against the drum, which end cooperates with the drum to predetermine the anchorage, and (2) thereafter to expand the friction device against the drum.

13. A brake comprising, in combination, friction means having overlapping separable ends, a radially-arranged applying member pivoted on one of said ends and acting on the other of said ends, and a radial operating arm behind and parallel to the applying member and engaging the unpivoted end of the applying member.

14. A brake comprising, in combination, friction means having separable ends, a radially-arranged applying member pivoted on one of said ends and in face abutting contact therewith said member acting on the other of said ends, and a radial operating arm engaging the unpivoted end of the applying member.

15. A brake comprising a friction member having an applying device mounted thereon by a transverse pivot, together with a coil spring sleeved on the end of said pivot and held compressed thereon by a part on the end of the pivot, said applying device lying in face abutting relation with said friction member.

16. A brake shoe having reinforcing plates secured to its sides, and with L-section thrust members secured to the sides of said plates and projecting across the ends of said plates.

In testimony whereof, we have hereunto signed our names.

VINCENT BENDIX.
LUDGER E. LA BRIE.